United States Patent [19]

Janni

[11] Patent Number: 4,799,986

[45] Date of Patent: Jan. 24, 1989

[54] METHOD OF FABRICATING POLYMER-COATED FABRIC OUTSIDE CORNER PIECES FOR SINGLE-PLY POLYMER-COATED FABRIC CORE ROOF MEMBRANES

[75] Inventor: Albert S. Janni, Saginaw, Mich.

[73] Assignee: Duro-Last Roofing, Inc., Saginaw, Mich.

[21] Appl. No.: 79,586

[22] Filed: Jul. 30, 1987

[51] Int. Cl.$^4$ .............................................. B32B 31/04
[52] U.S. Cl. .................................... 156/196; 156/211; 156/245; 156/256; 156/258; 52/58; 52/287; 52/288; 52/631
[58] Field of Search ............... 156/196, 211, 245, 256, 156/258; 52/58, 242, 254, 287, 288, 631, 523, 532, 540; 264/549, 550

[56] References Cited

U.S. PATENT DOCUMENTS

| | | | |
|---|---|---|---|
| 3,942,295 | 3/1976 | Schacht | 52/631 |
| 4,603,517 | 8/1986 | Lyons | 52/288 |
| 4,652,321 | 3/1987 | Greko | 156/196 |
| 4,668,315 | 3/1987 | Brady et al. | 156/278 |
| 4,700,512 | 10/1987 | Laska | 52/288 |

*Primary Examiner*—Caleb Weston
*Attorney, Agent, or Firm*—Learman & McCulloch

[57] ABSTRACT

A method of fabricating polymer-coated, fabric corner members for the integrated enclosures provided for projecting products such as air conditioners on unitary roof membranes. The corners have vertical walls forming a corner, comprising forming a first generally rectangular membrane segment with a side split part way, forming a second segment with a triangular-shaped corner portion, spreading the split edges of the first segment with an elongate male die part, placing the second segment over the male die part, and utilizing an elongate female die part having flat welding edges to retain the marginal edges of the second segment in engagement with the edges of the first segment contiguous to the split, and applying energy to heat-weld the lapped edges of the first and second segments. The corner piece formed is placed in position with portions of the first segment, forming vertical wall covers folded to form a corner and the remaining portions of the segment and the second segment lying flat in the general plane of the roof membrane. The flat lying portions of the corner piece are welded to the roof membrane, spanning strips join the vertical wall portion and have flat extensions which are likewise welded to the roof membrane.

15 Claims, 2 Drawing Sheets

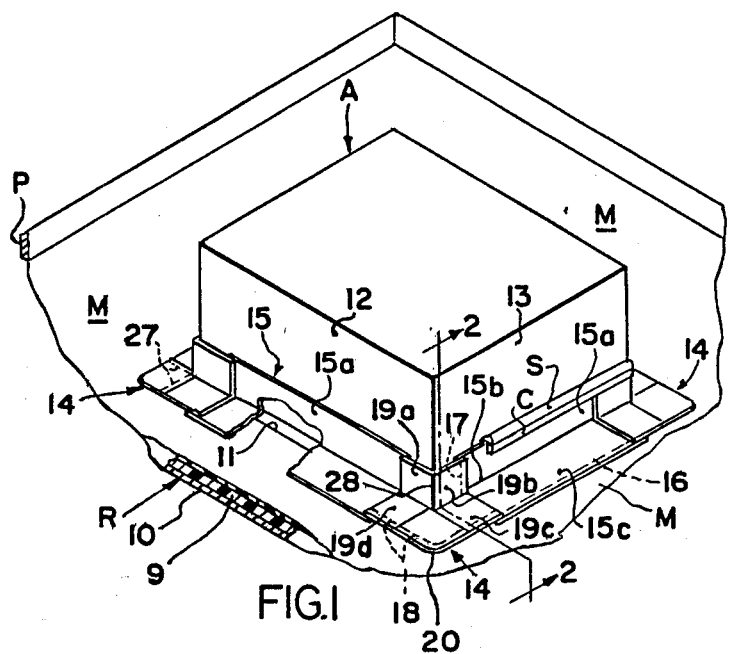
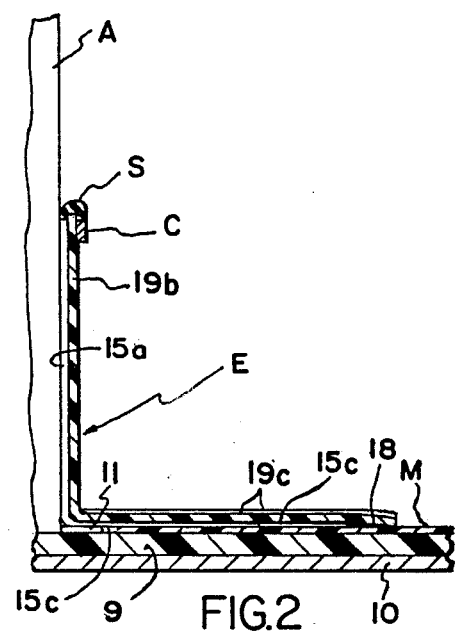
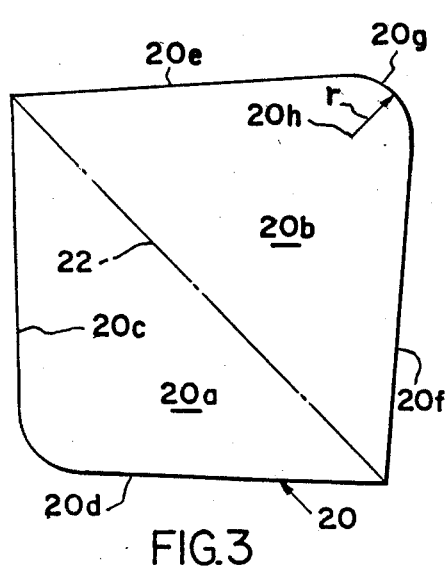
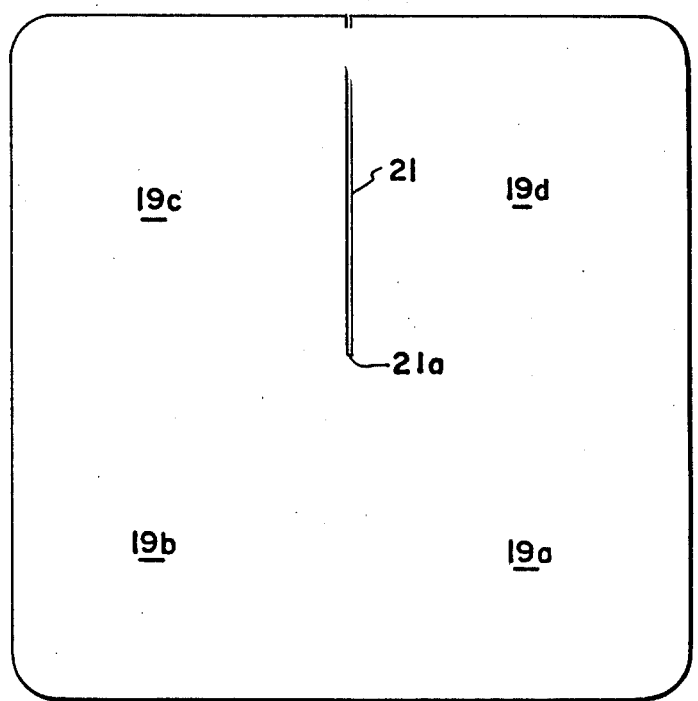

METHOD OF FABRICATING POLYMER-COATED FABRIC OUTSIDE CORNER PIECES FOR SINGLE-PLY POLYMER-COATED FABRIC CORE ROOF MEMBRANES

FIELD OF THE INVENTION

The present invention is concerned with single-ply, roof covering membranes which are custom fabricated to cover a particular roof surface.

BACKGROUND OF THE INVENTION

Light-weight, thermoplastic polymer-coated woven fabrics are in wide use today as roof covering membranes consisting of a plurality of strips which are electrically heat-welded in the factory to form unitary membranes which fit the contour of what may be termed "minimum pitched" roofs. Frequently, such membranes are installed over old roofing, and provide a roof covering which is reliably sealed, has excellent dimensional stability even with severe humidity and temperature changes, and does not become stiff, inflexible, or cracked when subjected to weathering, ultra violet rays, abrasions, and micro-organism attack.

Particularly on industrial roofs, provision must be made for the protrusion of large air-conditioning units, or make-up air units, which project from the roof surface. It is necessary that the membrane fabricated to fit the roof be provided with a vertically walled enclosure around the opening which is cut in the membrane so that the projecting unit may extend therefrom. The vertical walls which surround the air conditioning unit must then be sealed to the membrane and sealed to the air conditioning, or other unit, to absolutely prevent the entrance of any moisture, and provide an over-all, water-tight membrane which covers the roof.

The problem of enclosing vent pipe members which project from a roof structure has been solved recently for vent pipe enclosures, with the invention of the enclosure described in the present assignee's U.S. Pat. No. 4,652,321. However, it would be impractical to seek to form an enclosure, in the manner indicated in that patent, to surround and seal a housing as large as the casing of an air conditioning unit.

SUMMARY OF THE INVENTION

The present invention is concerned with the formation and installation of what are termed outside corner pieces, to fit the corners of the air conditioning or other unit. These, then, can be heat welded to the membrane proper, and to corner spanning sections which also are welded to the base membrane.

One of the prime objects of the present invention is to provide an improved method of forming large housing enclosures which can then be welded to the base cover in a reliable and leak-proof manner, and further sealed to the protruding unit in a manner to prevent the entrance of moisture between the unit and membrane.

A further object of the invention is to provide an enclosure of the character described which is of a strong and durable nature, and will not fail when subjected to wind-lift forces tending to raise the membrane.

Still another object of the invention is to provide an economical and practical method of fabricating outside corner pieces which will readily function as a part of a one-piece reinforced roof covering membrane, and which can be relatively simply installed in place in the field by relatively unskilled workmen.

The present method is characterized by forming a first generally rectangular membrane segment, with a side split interjacent its ends, forming a second membrane segment with a triangularly shaped inner corner portion, placing the first segment on an electrically energized base plate, spreading the split edges of the first segment with a male part which does not heat to welding temperature, shaping the second segment to vertical loop form and placing it over the male die part, such that its generally triangular corner portion has its marginal edges overlying the portions of the first segment contiguous to the split, placing a female welding die over the lapped portions of the first and second segments, and then applying electrical energy to heat weld the lapped edges of the first and second segments.

An outside corner piece may be heat welded at each corner of the air conditioning unit to both the base membrane and to the side strips which span the corner pieces. Finally, the upper edges of the enclosure formed are sealably secured to the projecting air conditioner or like unit.

Other objects and advantages of the invention will become apparent by reference to the following specification and to the drawings.

IN THE DRAWINGS

FIG. 1 is a fragmentary, perspective plan view of a portion of a roof membrane system, showing an air conditioning casing projecting upwardly above the roof surface and illustrating the manner in which a partial casing enclosure is formed in the membrane system;

FIG. 2 is an enlarged, sectional elevational view, taken on the line 2—2 of FIG. 1;

FIG. 3 is a top plan view of a first segment which is used in the formation of a corner piece;

FIG. 4 is a top plan view of a second segment which is joined to the first segment in a manner to be disclosed, to form the outside corner piece;

Figure 5:
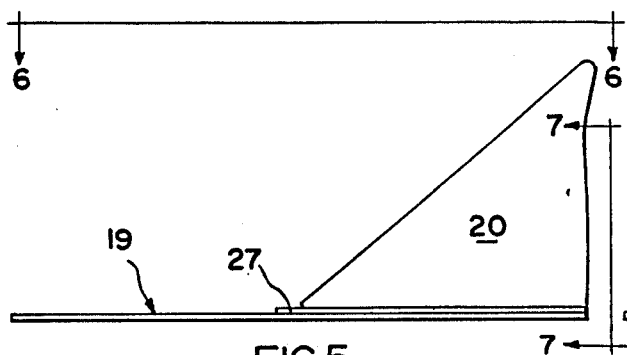
FIG. 5 is a side elevational view of the corner piece which is formed, the corner piece being shown in the shape which it naturally assumes, rather than in the shape in which it is held when welded in position to form an enclosure corner.

Referring now more particularly to the accompanying drawings, and in the first instance to FIGS. 1 and 2, a one-piece, single ply, thermoplastic polymer-coated fabric membrane, generally indicated by the letter M, is shown as overlying a roof, generally designated R, which may have a surrounding parapet wall generally designated P. The roof R may be a metal roof with insulation 9 provided between the membrane M and interlocked metal roof panels 10, which are supported on the usual purlins (not shown) forming the underlying roof support structure.

The closely woven, i.e., in the nature of canvas, polyester fiber reinforcing fabric or scrim, providing the core or base of the membrane M, may be formed of glyptal or alkyd resin threads, such as those formed by the linear esterification of phthalic acid and ethylene glycol. This closely woven fabric may be coated with a thermoplastic polymer, such as polyvinyl chloride, ethylene vinyl acetate, or another suitable polyolefin, for example.

Such membranes M are today prefabricated in the factory to fit a particular roof, and are secured in place with mechanical fasteners, ballasting or with an adhesive. The edges of the membrane M are normally brought up around the parapet walls P and secured in position. When a large sized unit, such as the commercial building air conditioning unit generally designated A, is encountered, a rectangular opening 11 is cut in the membrane to permit the side and end walls 12 and 13 of the unit A, to project. An enclosure, generally designated E, is then formed and welded integrally to the membrane M in a manner to prevent any entrance of moisture to the underlying roof system.

As FIGS. 1 and 2 particularly illustrate, the enclosure E disclosed comprises outside corner pieces, generally designated 14, which are joined by spanning strips, generally designated 15, formed by upper portions 15a, folded at 15b to form horizontal base sections 15c. Base sections 15c overlie the membrane M and are welded to it by commercially available heat applying guns or tools which weld the base portion 15c to the flexible membrane M at 16 along the entire length of portion 15c. The outside corner pieces 14 may be placed in position to lap the spanning strips 15, and may be heat welded to the strips 15, as at 17. Corner pieces 14 may be then similarly heat welded to the underlying membrane M along their edges as at 18.

As FIG. 1 shows, the corner pieces 14, when installed in a manner to be presently described, include vertically disposed wall portions 19a and 19b, provided in a first segment 19 (FIG. 4) formed from the membrane M material. At their upper ends, the walls 19a and 19b, and the walls 15a, are clamped to the vertical walls 12 and 13 of the unit A by a surrounding bar or band C, which secures also a bead of mastic or sealant S, to form a tight seal for the enclosure E around the air conditioning unit A. Each corner piece 14 is also fabricated from a second membrane material segment 20 (FIG. 3), which is particularly contoured to be welded to the first segment 19, in a manner to be presently described.

As FIG. 4 particularly indicates, the segment 19 has one of its sides slit intermediate its ends as at 21. The slit 21 divides the split portion of segment 19 into quadrant portions 19c and 19d, opposite the quadrant portions 19b and 19a, respectively.

Proceeding now with a more detailed description of segment 20 (FIG. 3), an imaginary line 22 may be considered to divide the flat segment 20 into an outside triangular section 20a, and an inside triangular section 20b, which projects eccentrically relative to bisecting line 22, and is larger in area than the section 20a. The edges 20c and 20d extend at slightly more than a 90° angle. The edges 20e and 20f extend relatively at slightly less than a 90°, and are connected by a curvilinear edge portion 20g, taken about a radius r from a locus 20h.

Figure 10:
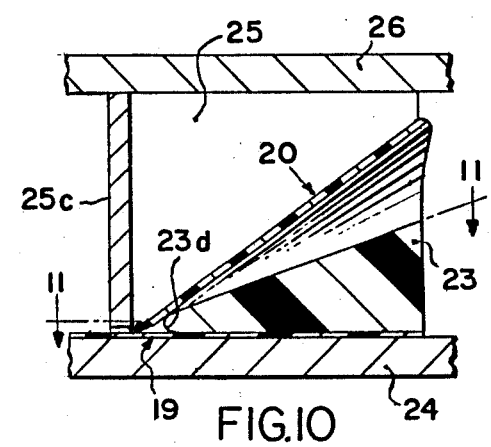
FIG. 10 is a sectional, elevational view, taken on the line 10—10 of FIG. 9.
Figure 11:
FIG. 11 is a sectional top plan view, taken on the line 11—11 of FIG. 10 and illustrating the positions of the die parts, when assembled with the first and second segments enclosed between them.
Figure 8:
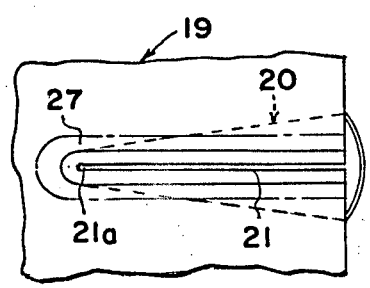
FIG. 8 is a fragmentary under plan view.

To form the corner piece 14 from coated fabric pieces 19 and 20, the segment 19 is placed in position over a male die of generally pyramidal shape 23 (FIG. 9), which is fixed to an electrically energized bottom plate 24, which may comprise the table or platform of a dielectric welding press. The male mold 23 which has a flat bottom face is of a hard, dense plastic material such as nylon which is not a microwave energy conductor and is relatively inert when r-f induced, high frequency microwaves are applied to the press components. Portions of the side walls of the male member 23 are substantially vertically flat as at 23a, for a major portion of the length of member 23. The side walls of the nose end of the member 23 are, however, necked in as at 23b, and merge with a blunted end 23c, as illustrated in FIG. 10 and FIG. 11. The walls of the necked-in portions 23b remain substantially vertical, but the end wall of nose portion 23 is slightly vertically round and inclined as shown at 23d.

When the segment 19 is placed in position over the die 23, with the inner end 21a of the slit 21 abutting nose portion 23c, the die 23 spreads the slit 21 and separates the section 19c from the section 19d by pivoting each of the sections 19c and 19d outwardly about the end or locus 21. The marginal edges of the segment 19 adjacent slit 21 come into abutting engagement with the walls 23a of the male member 23, but remain spaced from walls 23b (see FIG. 11).

Figure 9:
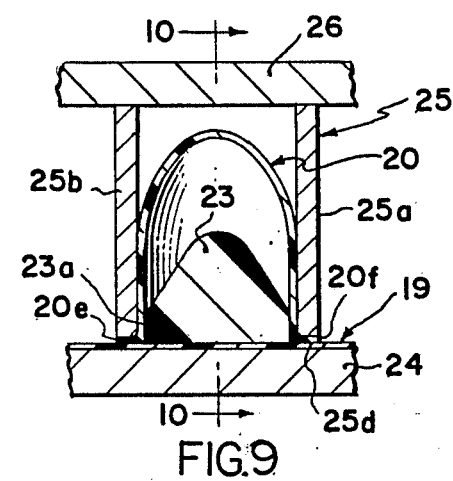
FIG. 9 is a cross-sectional view, taken on the line 9—9 of FIG. 11.

The second segment 20 is then folded to the loop form shown in FIGS. 5-9, such that its marginal edges 20e and 20f, and end 20g, the segment 19, as shown in FIG. 9. The V-shaped in plan section (FIG. 11) female die 25 is then placed over the edges 20e, 20f, and 20g in surrounding relation with the similarly convergent male die 23, to retain the edges 20e, 20f, and 20g in lapped position. The die 25 has vertical side walls 25a and 25b, joined at one end by a vertically extending curvilinear section 25c. When the die 25 is in position, the curvilinear section 25c is spaced inwardly of the end 23c of the male die 23, to leave a section 19e of segment 19 adjacent the head 21a of slit 21 uncovered. The necking in of walls 23b leaves further exposed portions 19f (FIG. 11). The bottoms of the walls 25a, 25b, and 25c are flat, and lie in a common plane to form a V-shaped welding surface 25d. The vertically movable top plate 26 of the welding press, which is lowered from a raised position, comes into engagement with the top of the V-shaped female die 25, and when r.f. induced, high frequency microwave energy is applied to the plates 24 and 26, the generally V-shaped weld area 25d sealably and securely secures the segment 20 to the segment 19. The portions 19e and 19f provide transition material to permit this planar weld 27 to occur along the V-shape of energy conducting die 25.

When a corner piece 14 is placed in position (FIG. 1), it will be noted that the looped portion of piece 20 is flattened out to become the base of the corner section 14, and the portions 19c and 19d also become flat, horizontal sections which weld to membrane M. The quadrant portions 19a and 19b fold along a line 28 to become the vertical walls which lap weld as at 17 to the sections 15a.

While the plates 24 and 26, and the female die 25, are formed of a material such as aluminum which welds the membrane material virtually instantaneously when r.f.-induced high frequency microwaves are applied, resistance heating units in contact with the surfaces 24 and 25 could also be used. Typical welding temperatures are employed in the range 275° to 325° F.

THE OPERATION

Figure 7:
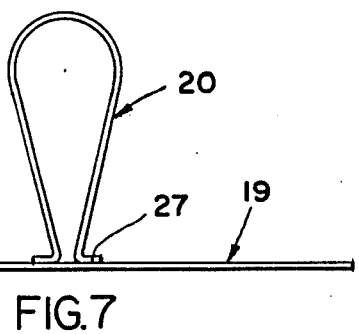
FIG. 7 is an end elevational view, taken on the line 7—7 of FIG. 5.
Figure 6:
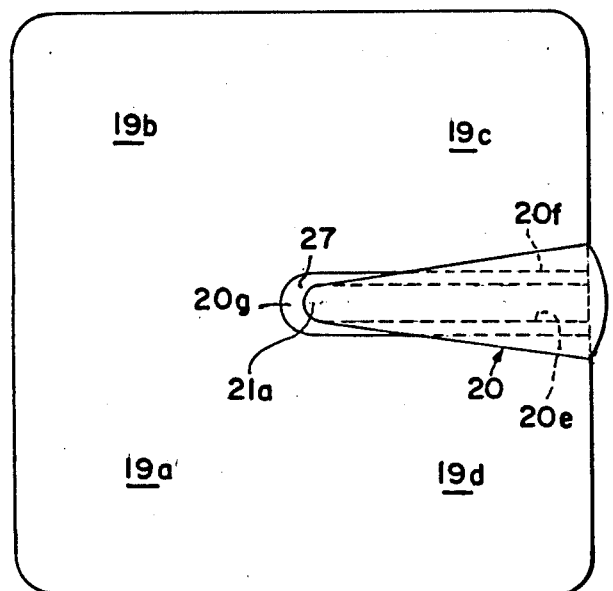
FIG. 6 is a top plan view, taken on the line 6—6 of FIG. 5.

In operation, the corner pieces 14 are formed in the manner indicated from the segments 19 and 20, and naturally assume the shape indicated in FIGS. 5-7. The male die 23 performs a dividing or deforming function, in the sense that when the segment 19 is applied to it, it spreads the sections 19c and 19d and holds them in spread position via the surfaces 23a. The material area provided at 19e and 19f provides transition fabric permitting the head end of the V-shaped weld to have the width of weld indicated. The male die 23 never becomes sufficiently hot that the segment 20 welds to it, and the segments 19 and 20 are welded along the lap 7, without either segment 19 and 20 sticking to the members 24 or 25.

It is important that section 20b have the shape indicated and be larger in area with respect to the imaginary line 2, and it is important that the end 23c of male die be spaced from female die end 25c to provide transition fabric for the looped section 20 at the head end of the tapered loop formed. Because the edges 20e and 20f extend upwardly at less than a 90° angle, an unwelded pucker is avoided at the interior side of the apex of the weld seam 27 where the material extends abruptly upwardly from the flat weld seam.

When the corner piece 14 is to be applied in the field in the manner indicated in FIG. 1, the flexible membrane fabric from which the corner unit is formed easily deforms such that the sections 19a and 19b fold along line 28, which automatically spreads the sections 19c and 19b to permit the section 20 to lie flat.

While one embodiment of the invention has been described in detail, it will be apparent to those skilled in the art that the disclosed embodiment may be modified. Therefore, the foregoing description in all aspects is to be considered exemplary, rather than limiting in any way, and the true scope of the invention is that defined in the following claims.

What is claimed is:

1. A method of fabricating polymer-coated, fabric-core, corner pieces, particularly for the integrated enclosures provided on single-ply, thermoplastic polymer-coated, fabric core roof membranes to partly cover large vertical structures projecting vertically from the roof which have vertical walls forming a corner, the corner pieces having base sections formed of membrane material and extending at an angle one to another to lie flatwise relative to and sealably secured to, the membrane, said base sections each having relatively angularly disposed vertical wall sections integrally joined along a vertical fold and adapted to fit said corner; the steps of:
    a. forming a first membrane segment with a part-way side split interjacent its ends;
    b. forming a second membrane segment with a generally triangularly-shaped corner portion;
    c. spreading and retaining the split edges of said first segment by placing them in abutting relation with opposing sides of an elongate male die part;
    d. bowing said second segment to the general shape of a loop and placing it over said male die part such that said generally triangularly-shaped corner portion has its marginal edges lapping the spread split marginal edges of the first segment around said male die part;
    e. placing an elongate female die part having flat welding edges to envelop said male die part such that said welding edges of the female die part engage said marginal edges of said second segment; and
    f. applying energy to heat-weld said marginal edges of the second segment to said marginal edges of said first segment abutting said male die part.

2. The method defined in claim 1 wherein said elongate female die part is V-shaped in plan view.

3. The method defined in claim 2 in which said V-shaped female die part at its apex is curvilinear, and has vertical side walls which substantially abut vertical side walls on said male die part.

4. The method defined in claim 3 wherein the male die part is generally pyramidal with a reduced inner end and is placed with its inner end enveloped by said apex of the female die part, said male die part being necked-in at its inner end relative to the side walls of said female die part when the die parts are in enveloped relation, the male die part being also spaced from said curvilinear apex of the female die part such that transition fabric is left in the first segment contiguous to the head end of the split therein which lies within the V-shaped weld seam which is formed.

5. The method defined in claim 1 wherein said first segment is placed on a dielectric press base plate at the time its split edges are spread, said upper movable press plate and base plate are moved relatively to place pressure on the female die plate, and electrical energy is applied to said female die part and base plate while pressure is being applied to heat weld the lapped edges of the first and second segments in a continuous V pattern.

6. The method defined in claim 5 wherein said male die part is formed of a relatively electrically non-conductive material.

7. The method defined in claim 1 wherein said triangularly shaped corner portion has edges extending at an angle relative to one another slightly less than 90° from the curvilinear corner portion.

8. The method of claim 6 wherein the male die part is formed of a dielectric material such as nylon which does not appreciably heat up when microwave energy is applied.

9. The method defined in claim 1 wherein said second membrane segment is generally rectangularly-shaped and has a second triangularly-shaped corner portion abutting said corner portion and integral therewith, said prior defined corner portion projecting eccentrically from an imaginary line extending to join the remaining corners of said second segment.

10. The method defined in claim 1 wherein said male die part has an apex portion and said first segment has a section immediately adjacent the end of the split, with which said apex portion of the male die part is substantially engaged when the split edges of the first segment are spread, said generally triangularly-shaped corner portion laps said section, and said female die part has an apex portion enveloping said apex portion of the die part to weld said generally triangularly-shaped corner portion to said section and form a continuous generally V-shaped weld.

11. The method defined in claim 10 wherein said male and female die parts are shaped and relatively spaced to capture side portions of the loop between them and maintain them in vertical shape, while providing transition material between the male and female die parts in said generally triangularly-shaped corner portion between the apex portions to prevent unsealed puckering of the material at the apex end of the generally V-shaped weld.

12. The method defined in claim 1 wherein said female die part is placed to envelope said male die part with only sufficient space between portions of their sides for engagement of portions of the sides of the loop with each of the male and female die parts to capture said portions of the loop between them and maintain the shape of said portions.

13. The method defined in claim 12 wherein said side portions of the loop are maintained in vertical shape.

14. The method defined in claim 13 wherein said marginal edges of the second segment are clamped to extend generally at right angles to said side portions of the loop by said female die part.

15. The method defined in claim 1 wherein said generally triangularly-shaped corner portion has a rounded apex portion with edges extending to the apex portion to define a slightly less than 90° angle.

* * * * *

UNITED STATES PATENT AND TRADEMARK OFFICE
CERTIFICATE OF CORRECTION

PATENT NO. : 4,799,986
DATED : January 24, 1989
INVENTOR(S) : Albert S. Janni

It is certified that error appears in the above-identified patent and that said Letters Patent is hereby corrected as shown below:

Column 4, line 18, change "round" to -- rounded -- .

Column 4, line 25, change "21" to -- 21a --.

Column 4, line 31, insert -- lap -- after "20g,".

Column 5, line 16, change "7" to -- 27 --.

Column 5, line 21, change "2" to -- 22 --.

Signed and Sealed this

Fifth Day of September, 1989

Attest:

DONALD J. QUIGG

Attesting Officer

Commissioner of Patents and Trademarks